(12) United States Patent
Izuhara et al.

(10) Patent No.: US 8,687,935 B2
(45) Date of Patent: Apr. 1, 2014

(54) OPTICAL FIBER MODULE AND METHOD OF MAKING OPTICAL FIBER MODULE

(75) Inventors: Noboru Izuhara, Kawasaki (JP); Hiroshi Takawa, Kawasaki (JP); Mitsuru Yumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 760 days.

(21) Appl. No.: 12/722,655

(22) Filed: Mar. 12, 2010

(65) Prior Publication Data
US 2010/0247049 A1 Sep. 30, 2010

(30) Foreign Application Priority Data
Mar. 26, 2009 (JP) .................. 2009-076996

(51) Int. Cl.
*G02B 6/00* (2006.01)
(52) U.S. Cl.
USPC ........................................ 385/137
(58) Field of Classification Search
None
See application file for complete search history.

(56) References Cited

U.S. PATENT DOCUMENTS

| 6,978,072 | B2 | 12/2005 | Arima |
| 7,239,783 | B2 * | 7/2007 | Yamamoto et al. ........... 385/123 |
| 7,899,296 | B2 * | 3/2011 | Shukunami et al. .......... 385/135 |
| 2006/0024015 | A1 | 2/2006 | Arima |

FOREIGN PATENT DOCUMENTS

| JP | 9-26379 | 1/1997 |
| JP | 10-79542 | 3/1998 |
| JP | 2004-45620 | 2/2004 |
| JP | 2004-53733 | 2/2004 |
| WO | WO 03/090325 | 10/2003 |

OTHER PUBLICATIONS

Japanese Office Action mailed Mar. 26, 2013 for corresponding Japanese Application No. 2009-076996.

* cited by examiner

*Primary Examiner* — Jerry Rahll
(74) *Attorney, Agent, or Firm* — Staas & Halsey LLP

(57) ABSTRACT

There is provided an optical fiber module including a reel having a flange on one side of both sides thereof, a first optical fiber being wound around the reel, a first adhesive being applied to a roll of the first optical fiber so that lines of the first optical fiber are fixed to each other and the roll of the first optical fiber is fixed to the flange of the reel, and a first sheet member being fixed to the roll of the first optical fiber with the first adhesive.

6 Claims, 16 Drawing Sheets

RELATED ART FIG. 3

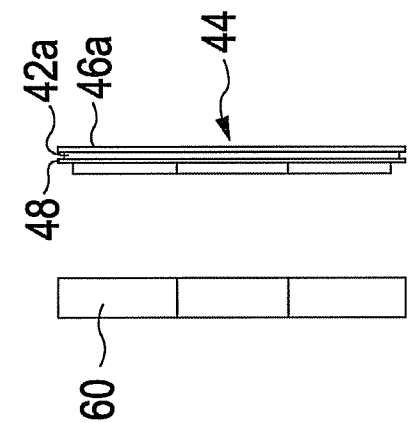
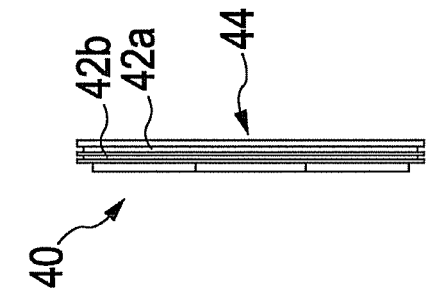
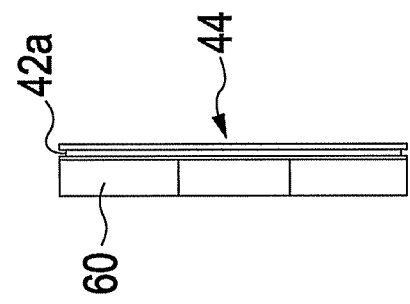
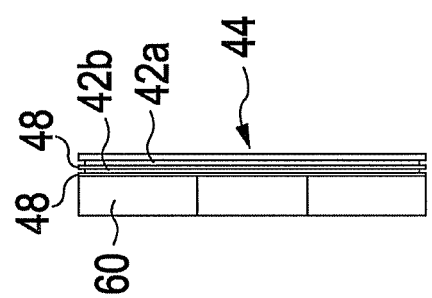
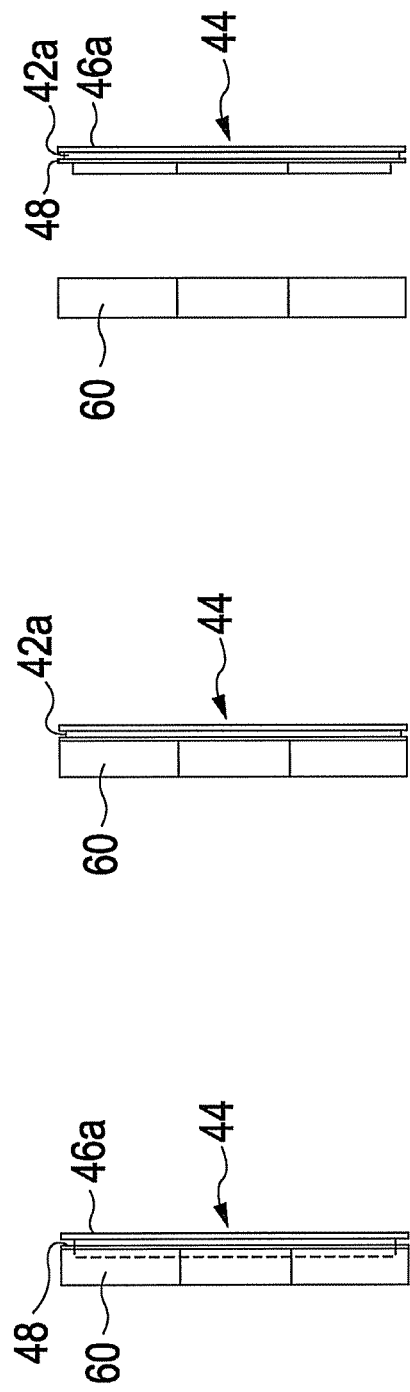
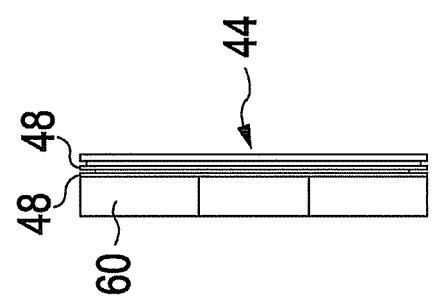

44A
46Aa
R

46Aa

OPTICAL FIBER MODULE AND METHOD OF MAKING OPTICAL FIBER MODULE

CROSS-REFERENCE TO RELATED APPLICATION

This application is based upon and claims the benefit of priority of the prior Japanese Patent Application No. 2009-076996, filed on Mar. 26, 2009, the entire contents of which are incorporated herein by reference.

FIELD

The embodiments discussed herein are related to an optical fiber module.

BACKGROUND

In the field of optical communications, optical fiber amplifiers are used to amplify optical signals. Optical fiber amplifiers are optical amplifiers that input signal light and pumping light to optical fibers and amplify the signal light inside the optical fibers. In many cases, optical fibers used in such optical fiber amplifiers are erbium-doped optical fibers (EDFs).

A typical optical fiber used for amplification (EDF) is as long as several tens of meters. Therefore, the optical fiber is wound around a reel so as to be housed in a casing of an optical fiber amplifier (see International Publication Pamphlet No. WO2003/090325, for example). Examples of an optical fiber module in which an optical fiber is wound around a reel include a dispersion compensation fiber module in which a dispersion compensation fiber is wound around a reel (see Japanese Laid-open Patent Publication No. 2004-53733, for example).

In general, a reel around which an optical fiber is to be wound is made of metal, such as aluminum alloy, having good thermal conductivity. In many cases, such a reel is provided with an electric heater. The characteristic of an optical fiber (EDF) changes with temperature. To suppress the change in the characteristic of the optical fiber, the optical fiber is heated with the electric heater and is kept at a constant temperature (for example, 65° C.±5° C.) higher than the ambient temperature. For this reason, most reels are made of metal having good thermal conductivity.

The shapes and sizes of reels around which optical fibers are to be wound are limited by the sizes of optical fiber amplifier modules and plug-in units in which the reels are to be included. With a recent increase in the volume of optical fiber communication traffic, the degree of integration of components in optical fiber communication apparatuses is increasing so as to accommodate more modules. Under such circumstances, the sizes of optical fiber amplifier modules and plug-in units to be included in such optical fiber communication apparatuses are becoming smaller. Accordingly, the sizes of optical fiber modules in which optical fibers are wound around reels are also becoming smaller with the reels themselves becoming smaller and thinner.

Meanwhile, to realize stable optical fiber amplification, multiple-stage, for example, two-stage, optical amplification is employed in some cases. Specifically, a desired amplification factor is obtained with two optical fibers provided for first and second stages, respectively. In such a case, two optical fibers are wound around a single reel. To realize such a configuration, a space along the periphery of the reel defined by sidewalls (flanges) provided on both sides of the reel for accommodating the optical fibers needs to be divided into two spaces by a partition provided between the sidewalls. No optical fibers may be accommodated by a portion of the reel occupied by the partition. Therefore, the amount (length) of optical fibers that are wound around and accommodated by a single reel is reduced. That is, in a case where an optical fiber having a specific length is wound around and accommodated by a reel, if the reel has a partition, the size (thickness) of the reel becomes larger by an amount equal to the thickness of the partition. This is contrary to the idea of reducing the sizes of optical fiber modules.

SUMMARY

According to an aspect of the embodiment, there is provided an optical fiber module including a reel having a flange on one side of both sides thereof, a first optical fiber being wound around the reel, a first adhesive being applied to a roll of the first optical fiber so that lines of the first optical fiber are fixed to each other and the roll of the first optical fiber is fixed to the flange of the reel, and a first sheet member being fixed to the roll of the first optical fiber with the first adhesive.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 16A to 16F illustrate different states of the reel and the gap-adjusting jig during winding of optical fibers;

DESCRIPTION OF EMBODIMENTS

In the case where a space that accommodates two optical fibers is divided by a partition provided in the midpoint between the sidewalls of the reel, if the outer diameters of the two optical fibers are the same as each other, the lengths of the optical fibers that may be accommodated in the divided spaces are the same. Nevertheless, the lengths of the optical fibers for the first and second stages are not always the same as each other. The lengths of the optical fibers often vary with various conditions including the amplification factor. Therefore, the position of the partition needs to be changed in accordance with the lengths of the first-stage and second-stage optical fibers. The partition, however, is integrally formed with the reel and is not movable. Hence, to change the lengths of the optical fibers or to change the length ratio between the first-stage and second-stage optical fibers, the reel needs to be replaced with another reel having a partition at another appropriate position. This means that different reels need to be individually designed and manufactured for different amplification factors and other conditions. Consequently, the cost of manufacturing such reels increases.

If two optical fibers may be wound around a reel without providing sidewalls (flanges) or a partition fixed to the reel, the thickness of the reel may be reduced by an amount equal to the thicknesses of the sidewalls or partition. Moreover, if such a partition fixed to the reel is not necessary, replacement of reels is not necessary even if the length ratio between two optical fibers is changed.

An optical fiber module according to an embodiment will be described with reference to the accompanying drawings. Prior to describing the embodiment concerned with the optical fiber module, an optical fiber amplifier module in which the optical fiber module is to be included and an optical communication apparatus in which the optical fiber amplifier module is to be included will be described briefly.

Figure 1:
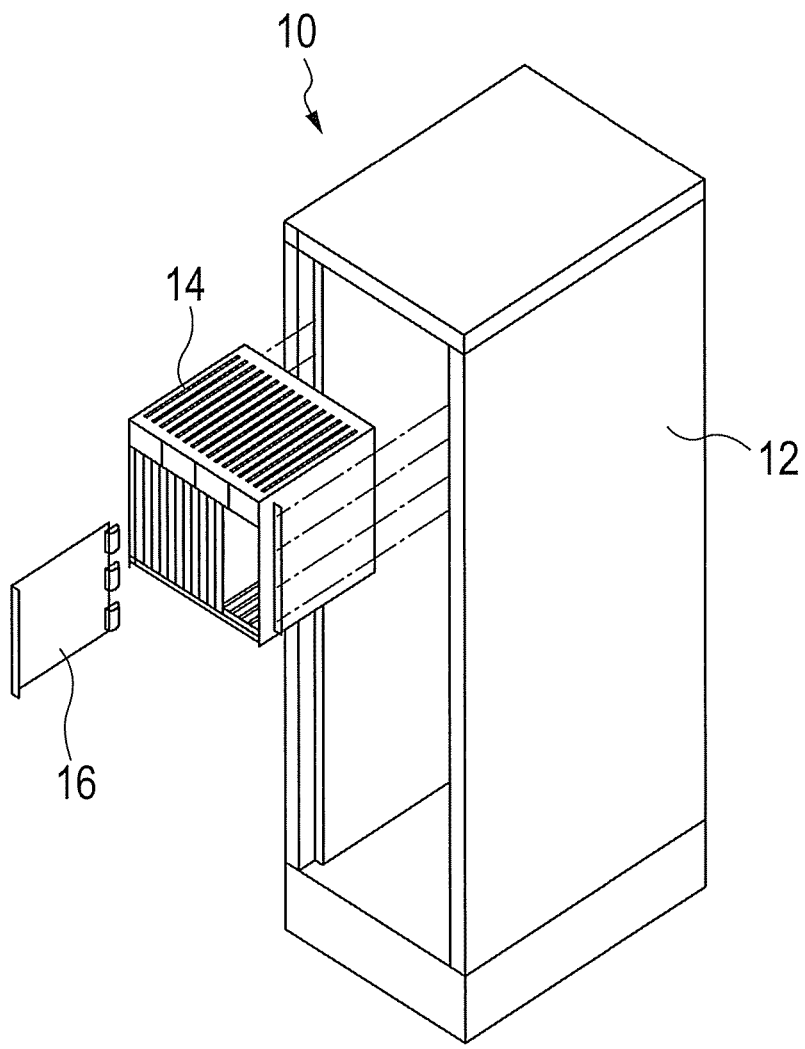
FIG. 1 is an exploded perspective view of an optical transmission apparatus.

FIG. 1 is an exploded perspective view of an optical transmission apparatus. An optical transmission apparatus 10 is, for example, an apparatus that converts an electrical signal into an optical signal, amplifies the optical signal, and sends the amplified optical signal to an optical transmission line. The optical transmission apparatus 10 includes a case 12. A plurality of sub-racks 14 are attached to the case 12. A plurality of plug-in units 16 are removably inserted in each of the sub-racks 14. The plug-in units 16 have respective functions, such as a function of converting an electrical signal into an optical signal, and a function of amplifying an optical signal.

Figure 2:
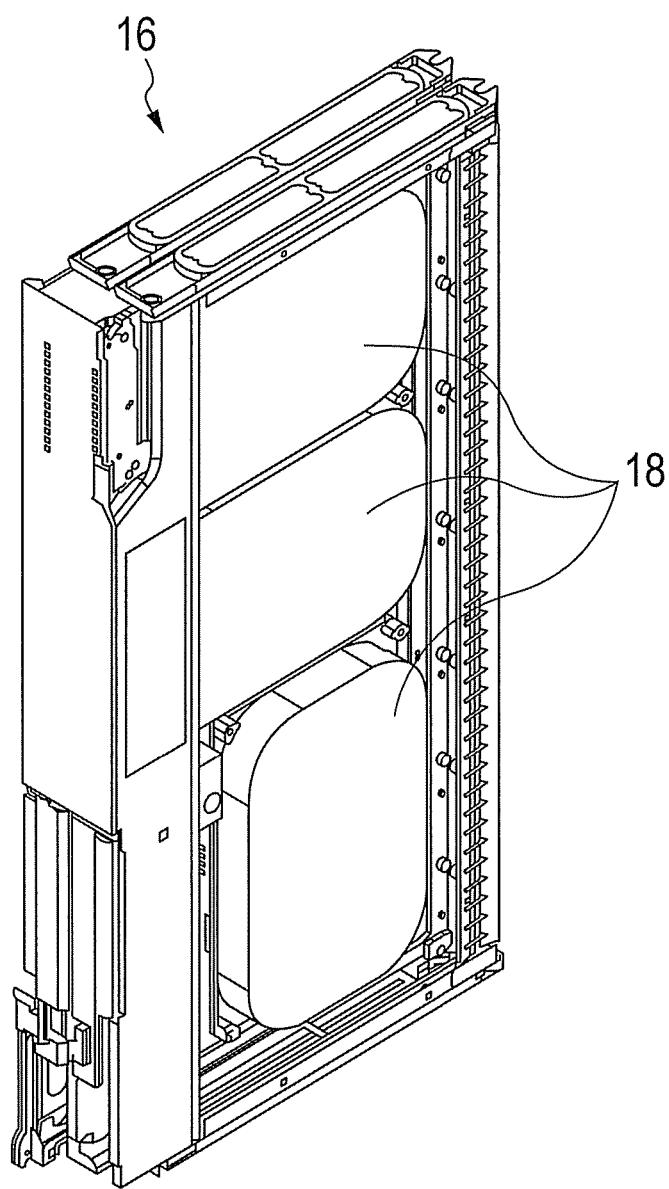
FIG. 2 is a perspective view of a plug-in unit.

FIG. 2 is a perspective view of one of the plug-in units 16. The plug-in unit 16 illustrated in FIG. 2 mainly performs amplification of an optical signal. The plug-in unit 16 includes amplifier modules 18 (three modules in FIG. 2) and a control circuit board (not illustrated) that controls amplification. The amplifier modules 18 each amplify and output an optical signal through an optical fiber.

Figure 3:
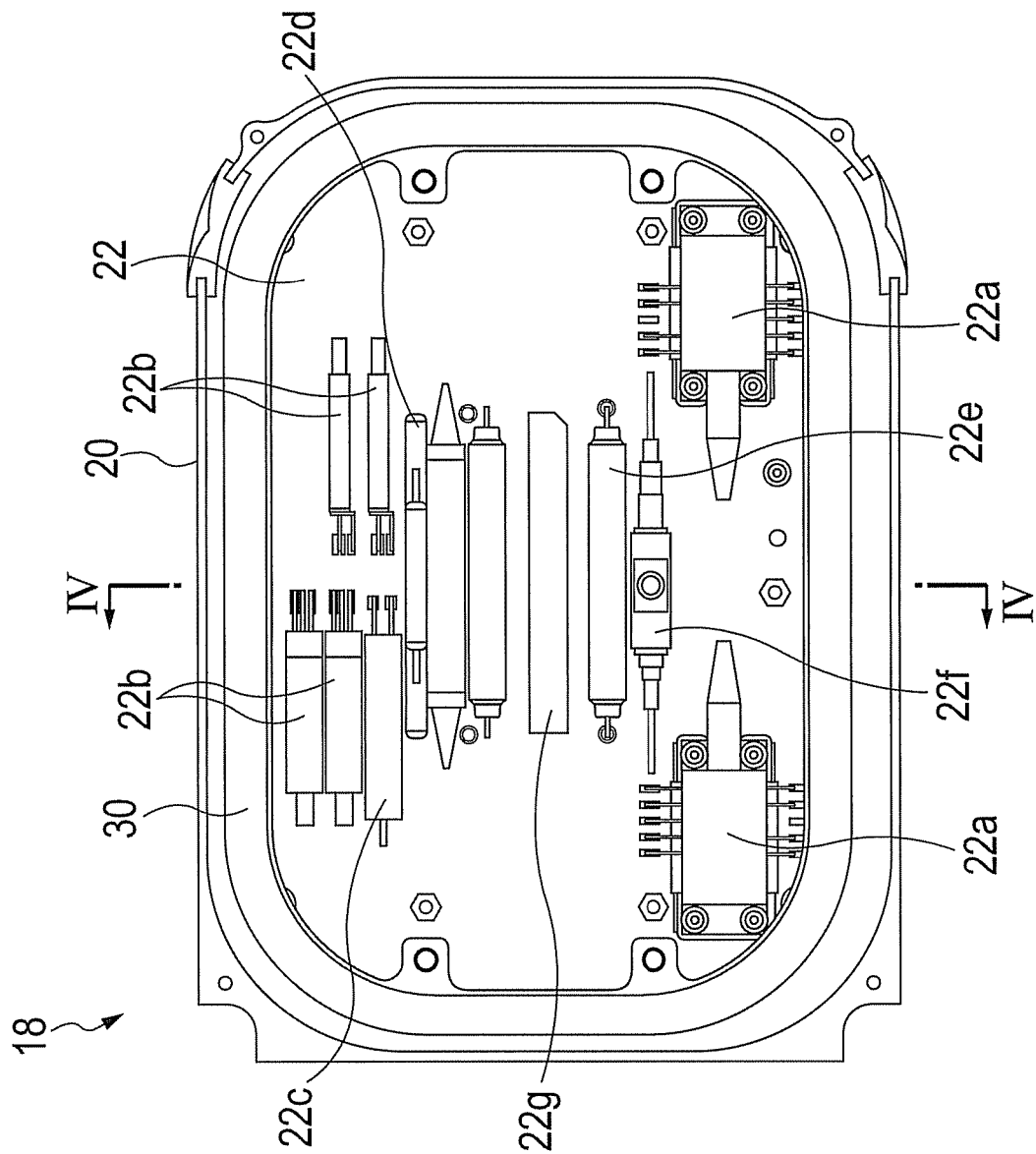
FIG. 3 is a plan view illustrating the internal configuration of an amplifier module.
Figure 4:
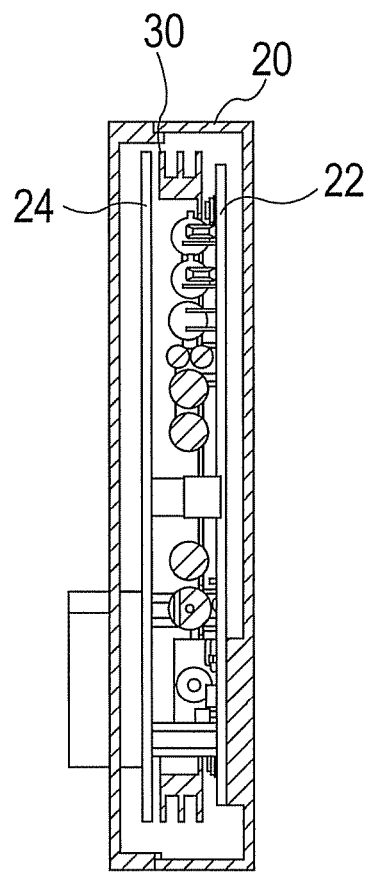
FIG. 4 is a cross-sectional view taken along the line IV-IV in FIG. 3.

FIG. 3 is a plan view illustrating the internal configuration of one of the amplifier modules 18. FIG. 4 is a cross-sectional view taken along the line IV-IV in FIG. 3. The amplifier module 18 includes a case 20 made of metal such as aluminum. The case 20 houses an amplitude control board 22 and an optical fiber module 30. The optical fiber module 30 is mounted on a printed board 24. The case 20 may not necessarily be made of metal and may be made of any other material such as resin.

The amplitude control board 22 is mounted with an amplification control circuit including the following components: laser diodes (LDs) 22a, photodiodes (PDs) 22b, a variable optical attenuator (VOA) 22c, a beam splitter (BS) 22d, a wavelength division multiplexing coupler (WDM coupler) 22e, a gain equalizer (GEQ) 22f, a connector 22g, and so forth. The amplitude control board 22 has a function of controlling optical components intended for amplification. In some cases, the function of controlling optical components intended for amplification is provided to the printed board 24. That is, the optical components intended for amplification may not necessarily be controlled solely by the amplitude control board 22. A configuration in which the amplitude control board 22 and the printed board 24 function as control boards is only exemplary.

Figure 5A:
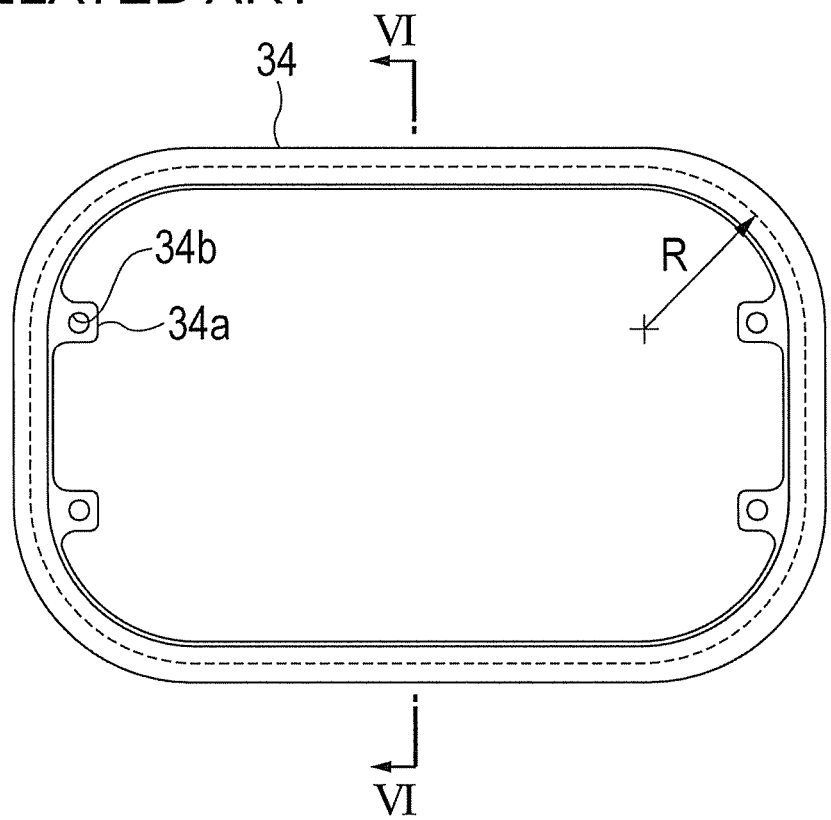
FIGS. 5A and 5B are a plan view and a side view, respectively, of an optical fiber module.
Figure 5B:
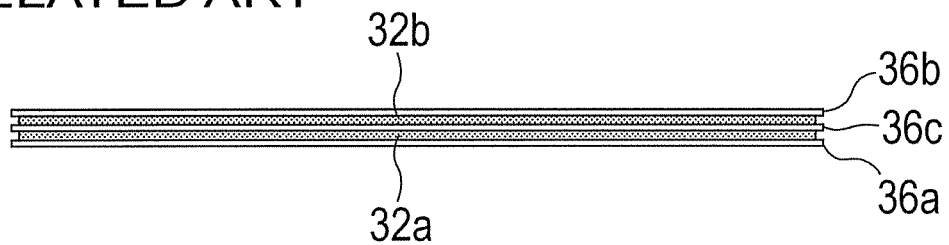
Figure 6:
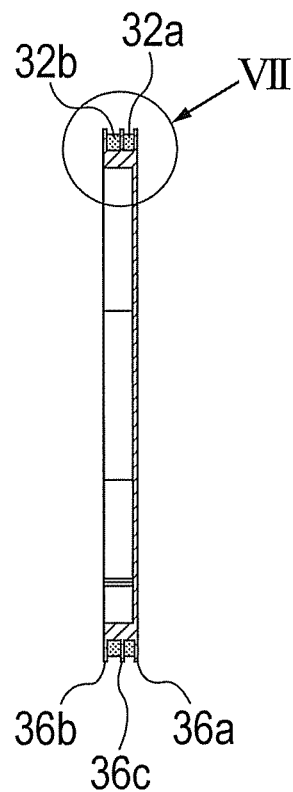
FIG. 6 is a cross-sectional view taken along the line VI-VI in FIG. 5A.
Figure 7:
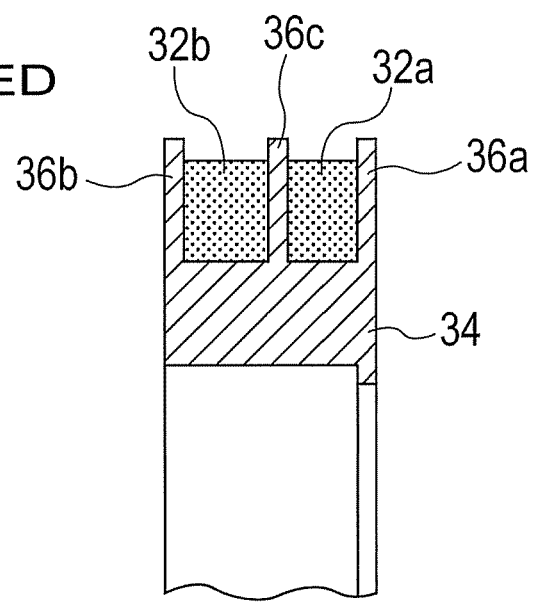
FIG. 7 is an enlarged view of the part VII in FIG. 6.

FIGS. 5A and 5B are a plan view and a side view, respectively, of the optical fiber module 30. FIG. 6 is a cross-sectional view taken along the line VI-VI in FIG. 5A. FIG. 7 is an enlarged view of the part VII in FIG. 6.

The optical fiber module 30 has a function of two-stage optical fiber amplification and includes optical fibers 32a and 32b used to amplify an optical signal and a reel 34 around which the optical fibers 32a and 32b are wound. To provide the optical fiber module 30 with the two-stage optical fiber amplification function, the two optical fibers 32a and 32b are wound around the reel 34. The reel 34 has a substantially rectangular shape. The surface of the reel 34 around which the optical fibers 32a and 32b are wound preferably has the corners thereof curved with a curvature radius R of about 20 mm, taking into consideration the allowable bend radii of the optical fibers 32a and 32b.

To allow the two optical fibers 32a and 32b to be wound around the reel 34, the reel 34 has first and second flanges 36a and 36b as sidewalls that define a space for accommodating the optical fibers 32a and 32b. Furthermore, a third flange 36c is provided between the first and second flanges 36a and 36b, whereby the space for accommodating the optical fibers 32a and 32b is divided into a space for accommodating the optical fiber 32a and a space for accommodating the optical fiber 32b.

The reel 34 is manufactured by cutting a metal material such as an aluminum alloy so that the reel 34 has sufficient thermal conductivity and stiffness. Therefore, to maintain sufficient stiffness, the first and second flanges 36a and 36b and the third flange 36c provided therebetween each have a thickness of at least about 0.5 to 1.0 mm. The smaller the thicknesses of the first, second, and third flanges 36a, 36b, and 36c are, the more the overall thickness of the reel 34 is advantageously reduced.

Since the third flange 36c is integrally formed with the reel 34 and is not movable, the size of the space between the first flange 36a and the third flange 36c for accommodating the optical fiber 32a and the size of the space between the second flange 36b and the third flange 36c for accommodating the optical fiber 32b may not be changed. Therefore, if the length ratio between the optical fibers 32a and 32b needs to be changed, the reel 34 may not be used, and another reel having the third flange 36c at a different position between the first and second flanges 36a and 36b needs to be designed and manufactured.

First Embodiment

An embodiment employs a configuration in which two optical fibers are able to be wound around and accommodated by a single reel without the second and third flanges 36b and 36c.

Figure 8A:
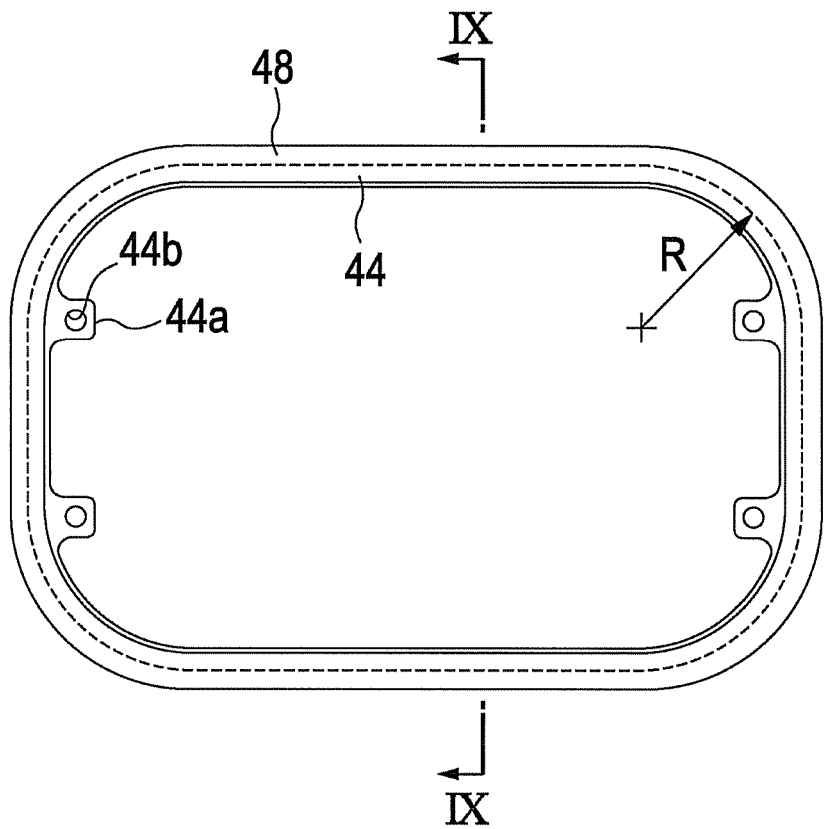
FIGS. 8A and 8B are a plan view and a side view, respectively, of an optical fiber module.
Figure 8B:
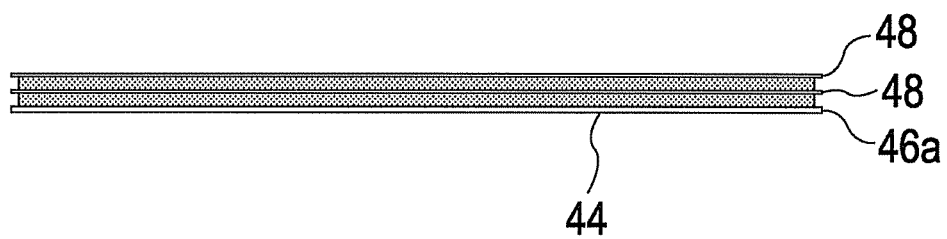
Figure 9:
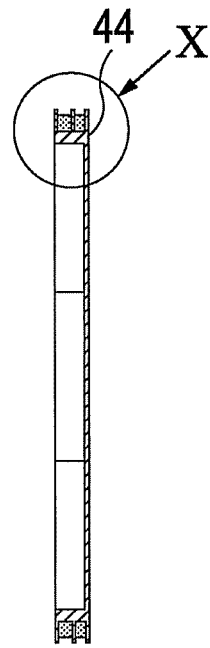
FIG. 9 is a cross-sectional view taken along the line IX-IX in FIG. 8A.
Figure 10:
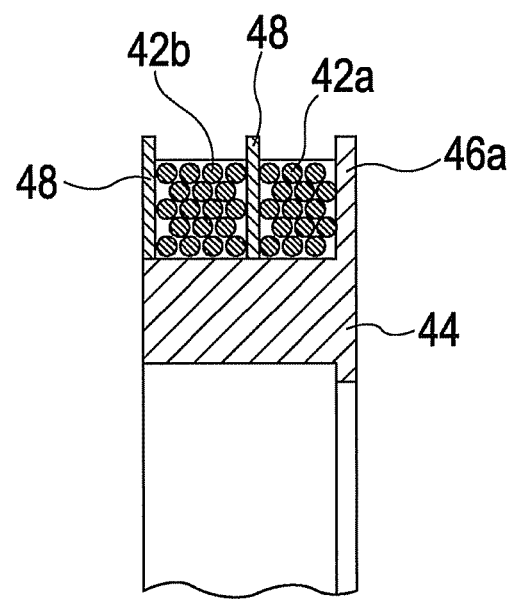
FIG. 10 is an enlarged view of the part X in FIG. 9.

FIGS. 8A and 8B are a plan view and a side view, respectively, of an optical fiber module 40 according to the embodiment. FIG. 9 is a cross-sectional view taken along the line IX-IX in FIG. 8A. FIG. 10 is an enlarged view of the part X in FIG. 9.

Referring to FIGS. 8A and 8B, an optical fiber module 40 (reference number 40 is not used in figures, which has a two-stage optical fiber amplification function, includes first and second optical fibers 42a and 42b used to amplify an optical signal and a reel 44 around which the optical fibers 42a and 42b are wound. To provide the optical fiber module 40 with the two-stage optical fiber amplification function, the two optical fibers 42a and 42b are wound around the single reel 44.

The reel 44 is manufactured by cutting a metal material such as an aluminum alloy so that the reel 44 has sufficient thermal conductivity and stiffness. Alternatively, the reel 44 may be manufactured in the form of an aluminum die-cast product. Since the reel 44 does not have the second and third flanges 36b and 36c illustrated in FIG. 7, the reel 44 may be manufactured by die casting. The reel 44 has a substantially rectangular shape. The surface of the reel 44 around which the optical fibers 42a and 42b are wound preferably has the corners thereof curved with a curvature radius R of about 20 mm, taking into consideration the allowable bend radii of the optical fibers 42a and 42b.

In the present embodiment, referring to FIG. 10, a sheet member 48, instead of the third flange 36c, is provided as a partition on the reel 44, thereby separating a portion having a roll of the first optical fiber 42a and a portion having a roll of the second optical fiber 42b. Furthermore, another sheet member 48, instead of the second flange 36b, is provided on the outer side of the roll of the second optical fiber 42b. The sheet members 48 are provided when the optical fibers 42a and 42b are wound around the reel 44. Steps of providing the sheet members 48 will be described separately below.

The sheet members 48 only needs to be made of a material that separates the roll of the optical fiber 42a and the roll of the optical fiber 42b. A film material called fiber sheet may be used as the sheet members 48. Preferably, polycarbonate film, which is soft resin, is used as the sheet members 48. If it is desired to increase the thermal conductivity of the sheet members 48 and realize even temperature distribution, thin aluminum plates (or aluminum foil) may be used as the sheet members 48.

Unlike the second and third flanges 36b and 36c illustrated in FIG. 7, the sheet members 48 do not need to have a function of defining spaces for accommodating the optical fibers 42a and 42b during winding of the optical fibers 42a and 42b. This means that the sheet members 48 do not need to be stiff, unlike the second and third flanges 36b and 36c. Therefore, the sheet members 48 may be made of a material thinner and more flexible than that of the second and third flanges 36b and 36c illustrated in FIG. 7. Accordingly, the thickness of the reel 44 may be reduced by an amount equal to the amount of reduction of the thicknesses of the second and third flanges 36b and 36c. Consequently, the overall thickness of the optical fiber module 40 is reduced.

Steps of winding the optical fibers 42a and 42b around the reel 44 will now be described.

First, the reel 44 around which the first and second optical fibers 42a and 42b are to be wound is prepared. As mentioned above, the reel 44 is manufactured by cutting an aluminum alloy, and, the reel 44 has only a first flange 46a provided on one side thereof and has no second and third flanges. Therefore, the reel 44 may be manufactured by casting. Specifically, the reel 44 may be molded by aluminum die casting and be finished by cutting.

Figure 11:
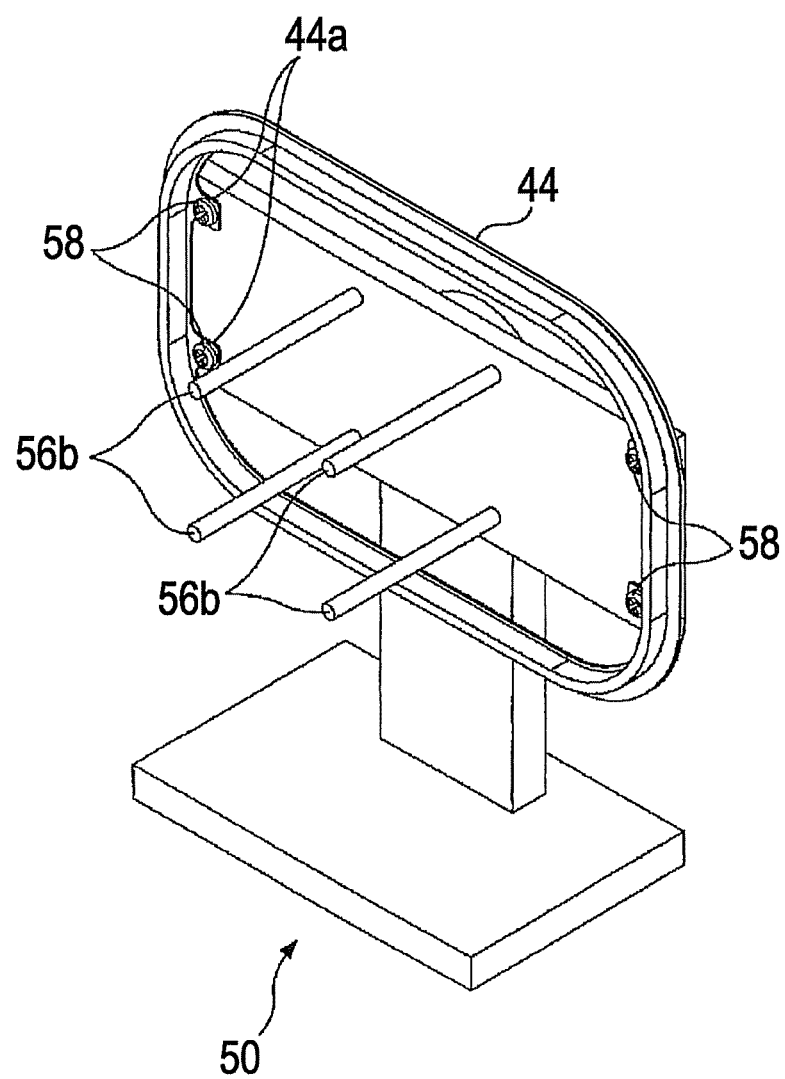
FIG. 11 is a perspective view illustrating a state where the reel is attached to a rotating jig.
Figure 12:
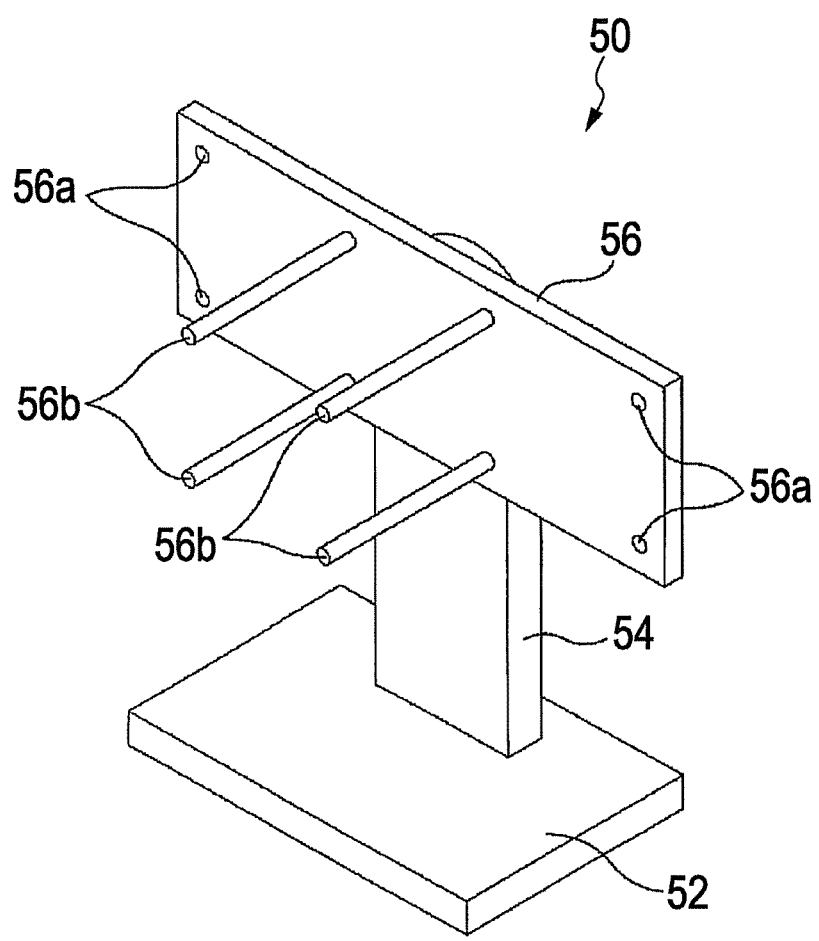
FIG. 12 is a perspective view of the rotating jig.

FIG. 11 is a perspective view illustrating a state where the reel 44 is attached to a rotating jig 50. FIG. 12 is a perspective view of the rotating jig 50. To wind the optical fibers 42a and 42b around the reel 44, referring to FIG. 11, the reel 44 is attached to a rotating jig 50 that rotates the reel 44. The rotating jig 50 includes a base plate 52, a support 54 extending perpendicularly from the base plate 52, and a rotating plate 56 rotatably supported by the support 54. The rotating plate 56 is rotatable with respect to the support 54. The rotating plate 56 has at the four corners thereof screw holes 56a provided in correspondence with fixing holes 44b provided in the reel 44. Referring to FIG. 11, the reel 44 is fixed to the rotating plate 56 with screws 58.

The rotating plate 56 also has in a central portion thereof four fixing rods 56b extending perpendicularly to the surface thereof. Since the reel 44 has an opening in a central portion thereof, in a state where the reel 44 is fixed to the rotating plate 56, the fixing rods 56b extend through the opening of the reel 44 as illustrated in FIG. 11.

Figure 13:
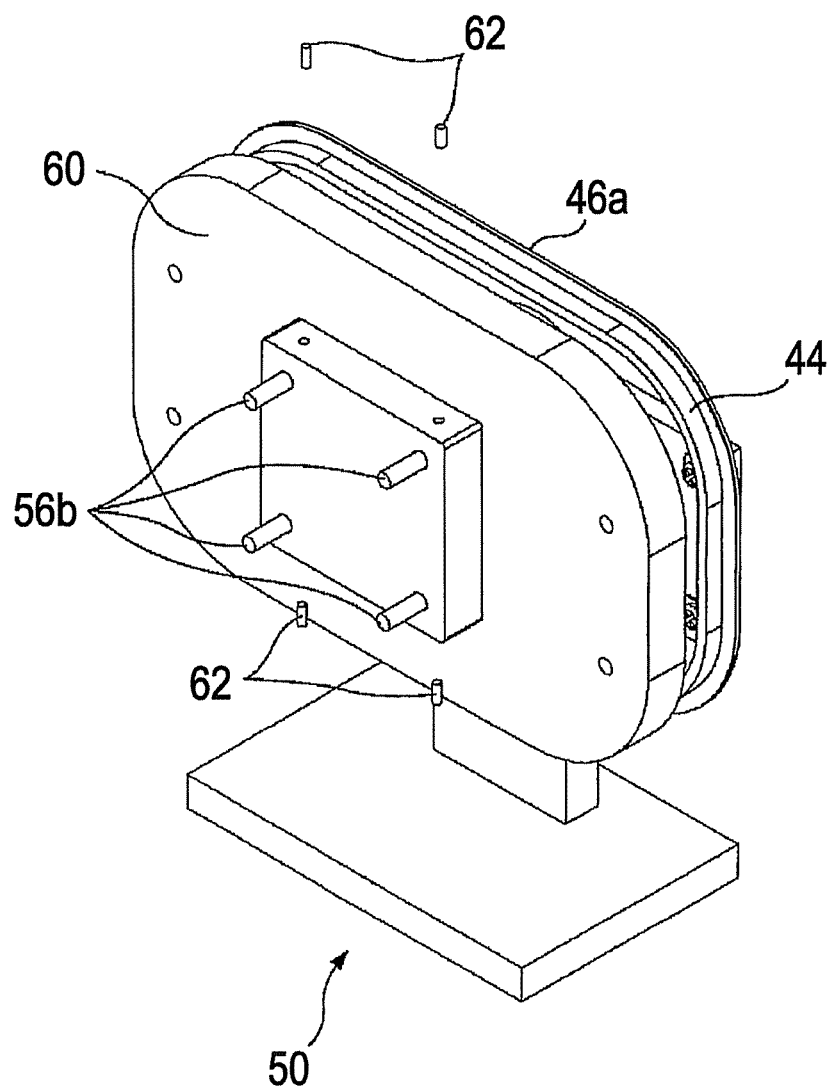
FIG. 13 is a perspective view illustrating a state where a gap-adjusting jig is attached to the rotating jig.
Figure 14A:
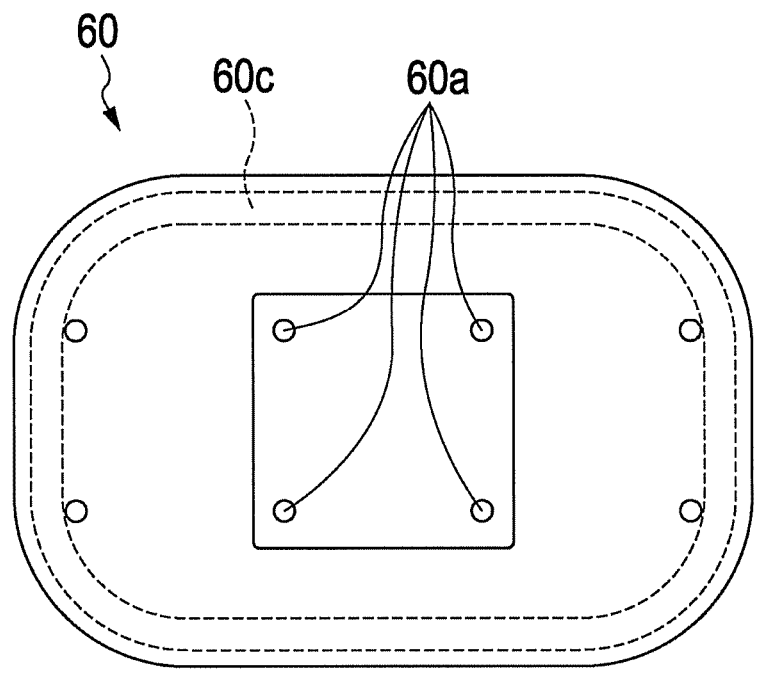
FIGS. 14A and 14B are a plan view and a side view, respectively, of the gap-adjusting jig.
Figure 14B:
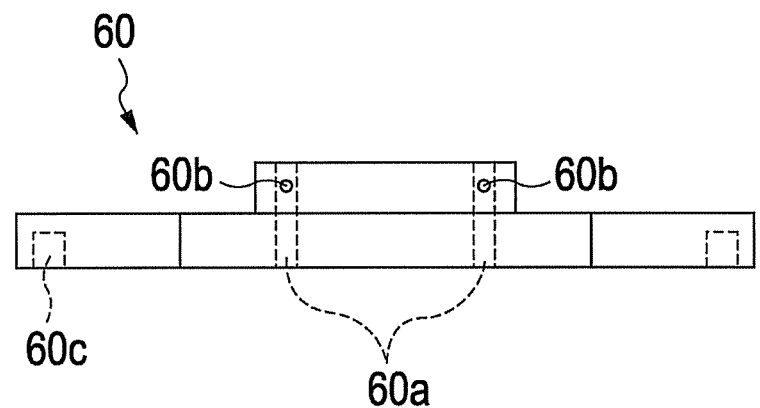
Figure 15:
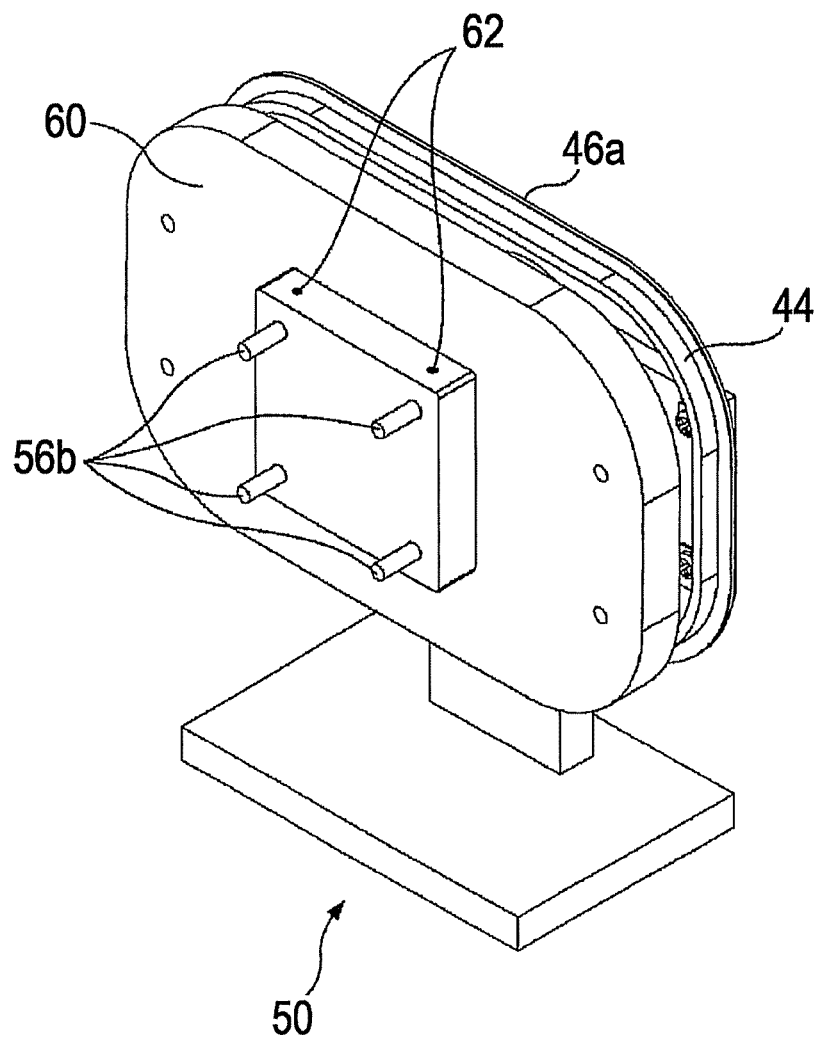
FIG. 15 is a perspective view illustrating a state where the gap-adjusting jig is fixed to the rotating jig.

FIG. 13 is a perspective view illustrating a state where a gap-adjusting jig 60 is attached to the rotating jig 50. FIGS. 14A and 14B are a plan view and a side view, respectively, of the gap-adjusting jig 60. FIG. 15 is a perspective view illustrating a state where the gap-adjusting jig 60 is fixed to the rotating jig 50. After the reel 44 is fixed to the rotating plate 56 of the rotating jig 50, referring to FIG. 13, a gap-adjusting jig 60 that defines spaces for accommodating the optical fibers 42a and 42b is fitted onto the fixing rods 56b. The gap-adjusting jig 60 is a plate-like member having substantially the same contour as the reel 44. The gap-adjusting jig 60 has in a central portion thereof four through holes 60a, which allow the respective fixing rods 56b to extend therethrough. The gap-adjusting jig 60 also has screw holes 60b extending perpendicularly to the respective through holes 60a. With the fixing rods 56b fitted in the through holes 60a, screws 62 are screwed into the screw holes 60b. Thus, referring to FIG. 15, the gap-adjusting jig 60 is fixed to the fixing rods 56b. That is, by fixing the gap-adjusting jig 60 to the fixing rods 56b, the gap-adjusting jig 60 is fixed at a specific position relative to the reel 44.

Referring to FIGS. 14A and 14B, the gap-adjusting jig 60 has on a surface thereof facing the reel 44 a reel-receiving groove 60c, into which the reel 44 fits when the gap-adjusting jig 60 is fitted onto the fixing rods 56b. Therefore, by pressing the gap-adjusting jig 60 along the fixing rods 56b, the surface of the gap-adjusting jig 60 facing the reel 44 is brought into contact with the first flange 46a of the reel 44. If the gap-adjusting jig 60 is fixed to the fixing rods 56b with a specific gap from the position of contact with the first flange 46a, a space for accommodating the optical fiber 42a or 42b is provided between the gap-adjusting jig 60 and the first flange 46a of the reel 44.

The gap-adjusting jig 60 is fixed to the fixing rods 56b with a specific gap from the position of contact in the following manner, for example. The gap-adjusting jig 60 is fixed to the fixing rods 56b with a spacer having a thickness equal to the length of a desired gap being interposed between the gap-adjusting jig 60 and the first flange 46a of the reel 44. Subsequently, the spacer is removed. Thus, the desired gap is provided between the gap-adjusting jig 60 and the first flange 46a of the reel 44.

The winding of the optical fibers 42a and 42b is performed as follows, using the rotating jig 50 and the gap-adjusting jig 60 configured as above. FIGS. 16A to 16F illustrate different states of the reel 44 and the gap-adjusting jig 60 during the winding of the optical fibers 42a and 42b. In FIGS. 16A to 16F, the gap-adjusting jig 60 is illustrated in a simple shape.

First, referring to FIG. 16A, the gap-adjusting jig 60 is fixed at a first distance from the first flange 46a of the reel 44. In this step, one of the above-described sheet members 48, as a first sheet member, is pasted to a portion of the surface of the gap-adjusting jig 60 facing the first flange 46a of the reel 44 with an adhesive or the like that will be peeled off easily later. Hence, the sheet member 48 on the gap-adjusting jig 60 faces the first flange 46a of the reel 44 at the first distance. Thus, a space for accommodating the optical fiber 42a is provided between the sheet member 48 and the first flange 46a.

Subsequently, referring to FIG. 16B, the first optical fiber 42a is wound around a winding surface of the reel 44 exposed between the sheet member 48 and the first flange 46a for a predetermined number of turns (a predetermined length). The first optical fiber 42a is wound by rotating the rotating plate 56 of the rotating jig 50. After winding the first optical fiber 42a, resin-based adhesive, as first adhesive, such as epoxy adhesive is applied to the roll of the first optical fiber 42a, whereby lines of the first optical fiber 42a are fixed to each other and the roll of the first optical fiber 42a is fixed to the reel 44. In this step, the sheet member 48, as the first sheet member, is also fixed to one side of the roll of the first optical fiber 42a with the first adhesive.

After the first adhesive is cured, referring now to FIG. 16C, the gap-adjusting jig 60 is separated from the reel 44. The roll of the first optical fiber 42a and the first sheet member 48, which are individually fixed with the first adhesive, remain on the reel 44.

If amplification is performed through a single optical fiber, an optical fiber module is completed with the first optical fiber 42a wound around the reel 44. Since the reel 44 does not have a fixed second flange, even if the length of the first optical fiber 42a is changed, there is no need to change the size of the space for accommodating the first optical fiber 42a, that is, another reel 44 having the same shape and dimensions is used. Moreover, if the first sheet member 48 is thinner than the second flange, the thickness of the reel 44 is reduced by an amount equal to the amount of reduction of the thickness of the second flange.

If amplification is performed through two optical fibers, the following steps of winding the second optical fiber 42b around the reel 44 are performed.

First, another sheet member 48, as a second sheet member, is pasted to the surface of the gap-adjusting jig 60 facing the reel 44 with an adhesive or the like that will be peeled off easily later. Subsequently, referring to FIG. 16D, the gap-adjusting jig 60 is fixed to the rotating jig 50 again. In this step, the gap-adjusting jig 60 is fixed such that the second sheet member 48 pasted to the gap-adjusting jig 60 faces the first sheet member 48 fixed to the side of the roll of the first optical fiber 42a at a second distance. Thus, a space for accommodating the second optical fiber 42b is provided between the second sheet member 48 pasted to the gap-adjusting jig 60 and the first sheet member 48 fixed to the side of the roll of the first optical fiber 42a.

Subsequently, referring to FIG. 16E, the second optical fiber 42b is wound around a winding surface of the reel 44 exposed between the sheet member 48 pasted to the gap-adjusting jig 60 and the sheet member 48 fixed to the side of the roll of the first optical fiber 42a for a predetermined number of turns (a predetermined length). The second optical fiber 42b is wound by rotating the rotating plate 56 of the rotating jig 50. After winding the second optical fiber 42b, resin-based adhesive, as second adhesive, such as epoxy adhesive is applied to the roll of the second optical fiber 42b, whereby lines of the second optical fiber 42b are fixed to each other and the roll of the second optical fiber 42b is fixed to the reel 44. In this step, the second sheet member 48 is also fixed to one side of the roll of the second optical fiber 42b with the second adhesive.

After the second adhesive is cured, the gap-adjusting jig 60 is separated from the reel 44. The roll of the first optical fiber 42a, the roll of the second optical fiber 42b, and the two sheet members 48, which are individually fixed with the adhesive, remain on the reel 44. Therefore, by removing the reel 44 from the rotating jig 50, the optical fiber module 40 is completed as illustrated in FIG. 16F.

In the optical fiber module 40, the two optical fibers 42a and 42b are wound around the reel 44. If the above-described steps are repeated, three or more optical fibers may be wound around the reel 44.

According to the present embodiment, the reel 44 only needs to have the first flange 46a because a space for accommodating an optical fiber is defined as a gap provided between the gap-adjusting jig 60 and the first flange 46a. Hence, there is no need to prepare a different reel or to modify the reel 44 in order to change the size of the space for accommodating an optical fiber.

There is also no need to mechanically process the reel 44 in order to provide a space (groove) for accommodating an optical fiber. A space having any width is provided on the reel 44 by adjusting the gap between the gap-adjusting jig 60 and the first flange 46a of the reel 44. In a case where a space (groove) for accommodating an optical fiber is provided by mechanical processing, the width of the space (groove) needs to be at least about 1 mm, for example, because of factors regarding the cutting tools and the thickness of the flange. In contrast, according to the present embodiment, a space narrower than 1 mm may be provided easily.

The present embodiment employs only the sheet members 48, instead of the second and third flanges 36b and 36c illustrated in FIG. 7, that are thinner than the first to third flanges 36a to 36c. Therefore, the thickness of the reel 44 may be reduced by an amount equal to the amount of reduction of the thicknesses of the second and third flanges 36b and 36c. Consequently, the overall thickness of the optical fiber module 40 may be reduced.

Second Embodiment

Figure 17A:
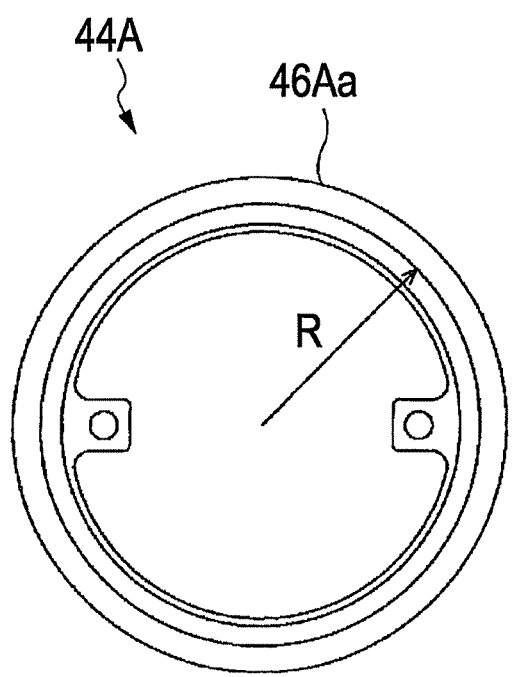
FIGS. 17A and 17B are a plan view and a side view, respectively, of a circular reel.
Figure 17B:
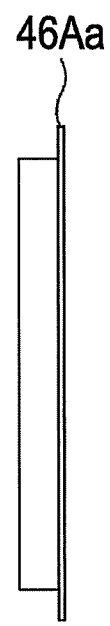

FIGS. 17A and 17B are a plan view and a side view, respectively, of a circular reel. While the reel 44 illustrated in FIGS. 8A and 8B has a substantially rectangular shape, the shape of the reel 44 is not limited thereto and may be any other shape as long as an optical fiber is wound therearound efficiently. For example, referring to FIGS. 17A and 17B, the reel 44 may be replaced with a circular reel 44A. As in the case of the reel 44, the circular reel 44A has only a first flange 46Aa, without second and third flanges. The surface of the circular reel 44A around which optical fibers are wound preferably forms a circle with a radius R of about 20 mm, taking into consideration the allowable bend radii of the optical fibers.

The optical fiber modules described above each accommodate a plurality of optical fibers wound therearound. If a small-sized optical fiber module is provided in the opening of the reel, a space occupied by a single optical fiber module may accommodate more optical fibers. Such a configuration will now be described, taking a case of circular reels as an example.

Figure 18:
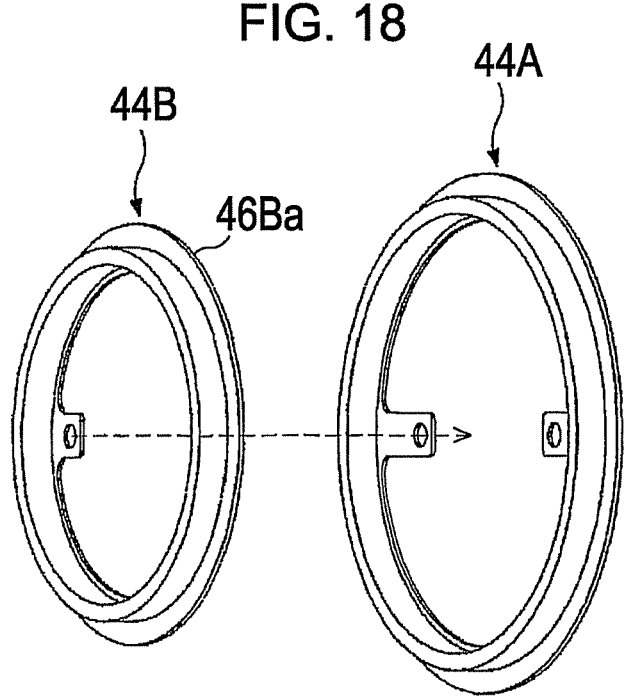
FIG. 18 is a perspective view illustrating a large circular reel and a small circular reel.
Figure 19:
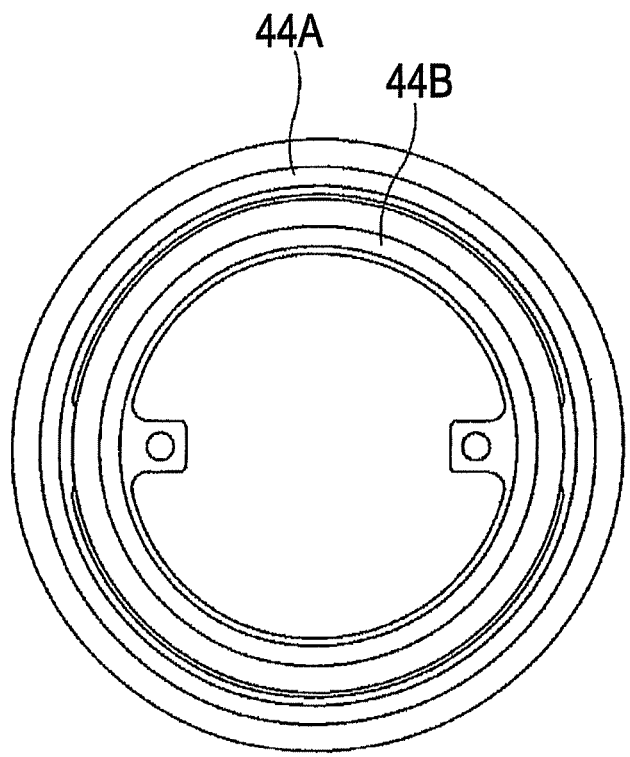
FIG. 19 is a plan view illustrating a state where the small circular reel is fitted in the large circular reel.

FIG. 18 is a perspective view illustrating the circular reel 44A and another circular reel 44B smaller than the circular reel 44A. FIG. 19 is a plan view illustrating a state where the small circular reel 44B is fitted in the large circular reel 44A. The outer diameter of the small circular reel 44B, i.e., the outer diameter of a first flange 46Ba of the circular reel 44B, is smaller than the inner diameter of the large circular reel 44A. Referring to FIG. 19, the small circular reel 44B is fitted into the opening in the large circular reel 44A. Although only the circular reels 44A and 44B are referred to herein, even in a case where optical fibers are wound around the circular reels 44A and 44B to form optical fiber modules, one of the optical fiber modules formed by the small circular reel 44B is likewise fitted into the opening of the other optical fiber module formed by the large circular reel 44A.

Such a configuration in which a small optical fiber module is fitted inside a large optical fiber module is realized not only with circular reels but also with reels having any other shapes, as long as the reels that are to be combined together to form an optical fiber module have the same shape but are of large and small sizes. Thus, a space occupied by a single optical fiber module accommodates more optical fibers. Consequently, a denser optical fiber amplifier is realized.

According to embodiments described above, the reel only needs to have a flange on one side thereof because a space for accommodating an optical fiber is defined as a gap provided between the gap-adjusting jig and the flange of the reel. Hence, there is no need to prepare a different reel or to modify the reel in order to change the size of the space for accommodating an optical fiber.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical fiber module comprising: a reel having multiple sides, including a flange on one side; a first optical fiber wound around the reel; a first adhesive applied to a roll of the first optical fiber so that lines of the first optical fiber are fixed to each other and the roll of the first optical fiber is fixed to the flange of the reel; and a first sheet member fixed to the roll of the first optical fiber with the first adhesive where an area defined by the first sheet member is changeable.

2. The optical fiber module according to claim 1, further comprising:
   a second optical fiber wound around the reel;
   a second adhesive applied to a roll of the second optical fiber so that the second optical fiber are fixed to each other and the roll of the second optical fiber is fixed to the reel and the first sheet member; and
   a second sheet member fixed to the roll of the second optical fiber with the second adhesive.

3. The optical fiber module according to claim 2, wherein the first sheet member and the second sheet member are resin sheets that are thinner than the flange.

4. The optical fiber module according to claim 2, wherein the first sheet member and the second sheet member are metal sheets that are thinner than the flange.

5. An optical fiber module comprising:
   a reel having multiple sides, and including a flange on one side;
   a first optical fiber wound around the reel;
   a first adhesive applied to a roll of the first optical fiber so that lines of the first optical fiber are fixed to each other and the roll of the first optical fiber is fixed to the flange of the reel; and
   a first sheet member fixed to the roll of the first optical fiber with the first adhesive so that a size of a space between the flange and the first sheet member is variable.

6. The optical fiber module according to claim 5, comprising:
   a second optical fiber wound around the reel;
   a second adhesive applied to a roll of the second optical fiber so that the second optical fiber are fixed to each other and the roll of the second optical fibers is fixed to the reel and the first sheet member; and
   a second sheet member fixed to the roll of the second optical fiber with the second adhesive so that a size of a space between the first sheet member and the second sheet member is variable.

* * * * *